Patented Dec. 6, 1949

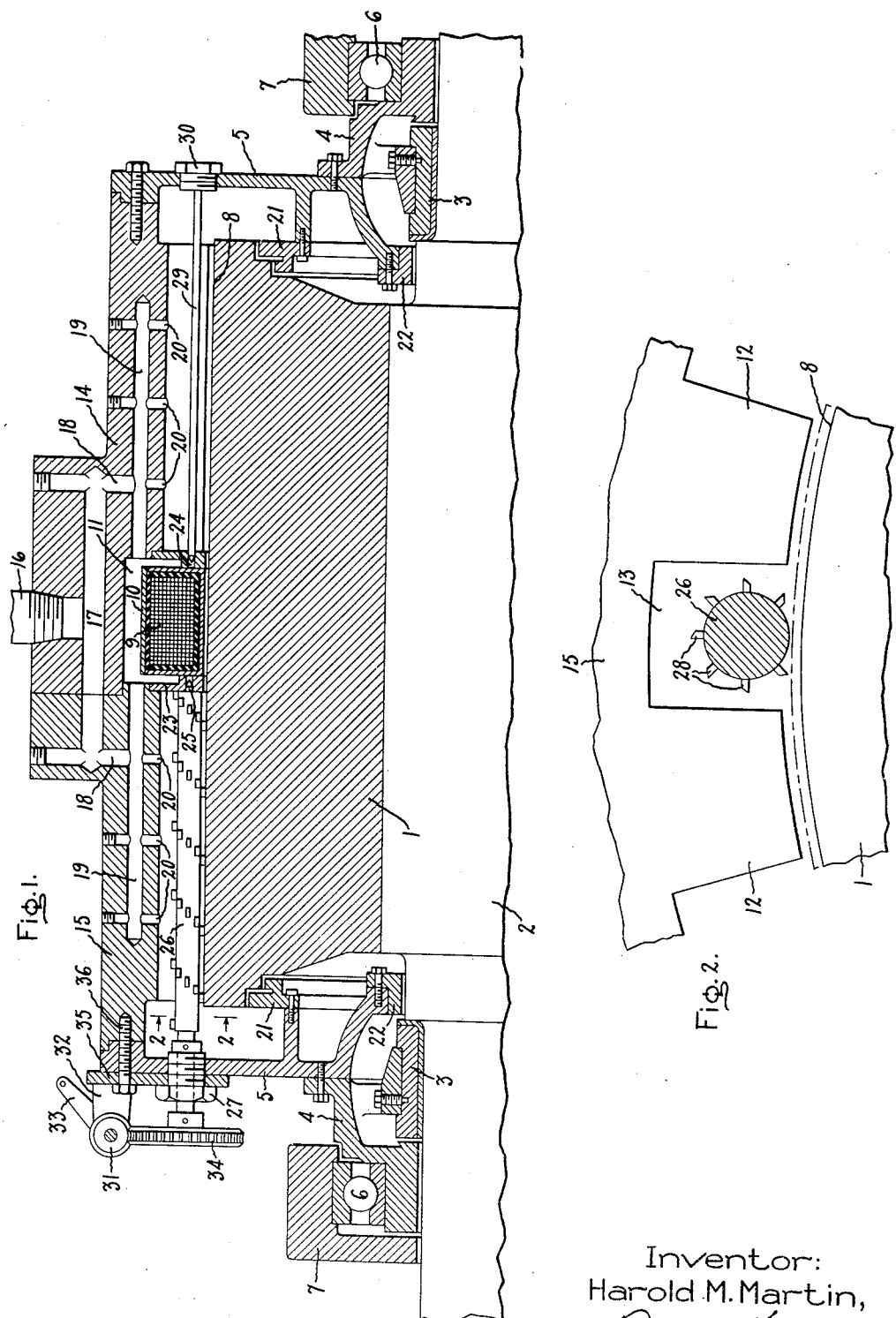

2,490,531

UNITED STATES PATENT OFFICE 2,490,531

INDUCTOR TYPE DYNAMOELECTRIC MACHINE AND CLEANER APPARATUS

Harold M. Martin, Phoenix, Ariz., assignor to General Electric Company, a corporation of New York Application November 23, 1946, Serial No. 711,900

8 Claims. (Cl. 172—285)

My invention relates to dynamoelectric machines and in particular to an inductor eddy current type machine in which cooling fluid is supplied into direct contact with the rotatable member of the machine and provision is made for cleaning the inductor surface of this rotatable member of the machine.

An object of my invention is to provide an improved inductor type dynamoelectric machine and cleaner apparatus.

Another object of my invention is to provide an improved inductor type dynamoelectric machine and cleaner apparatus in which arrangement is made for removal of scale from the inductor surface of the rotatable member of the machine.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a sectional side elevational view of the upper part of an inductor eddy current type dynamoelectric machine provided with an embodiment of my invention; and Fig. 2 is a sectional view taken along line 2—2 of Fig. 1.

Referring to the drawing, I have shown an embodiment of my invention applied to an inductor eddy current type dynamoelectric machine which is adapted to be used as a brake, clutch, or dynamometer. In this construction, a rotatable member is provided with a core 1 of magnetic material mounted in driving engagement on a shaft 2 which is rotatably supported in suitable bearings, such as journal bearings 3 mounted in bearing housings 4 secured to end shield members 5 of the relatively stationary member of the machine. Where this type construction is utilized as a clutch or dynamometer, the outer member also is rotatably supported, as shown in Fig. 1, by a suitable bearing, such as antifriction ball bearings 6, mounted in supporting pedestals 7 of any suitable type. In the illustrated arrangement, eddy currents are adapted to be induced in the inductor surface 8 of the rotatable member core 1 when this core is rotated and magnetic excitation is provided to the machine. This excitation is adapted to be provided by a suitable field exciting winding shown as comprising a substantially toroidal coil 9 mounted in and insulated from a waterproof container 10 arranged in a winding recess 11 in the relatively stationary outer member of the machine. Energization of the field exciting winding coil 9 is adapted to produce a magnetic field in the machine which links the rotatable member core 1 and passes into flux-concentrating tooth means 12 circumferentially spaced by slots 13 and arranged around the inner periphery of the stationary member which is formed of two main cores 14 and 15 of magnetic material.

In this type machine, the eddy currents which are generated in the relatively smooth inductor eddy current surface 8 of the rotor tend to heat up this part of the machine, and provision is made for removing this heat from the machine by supplying cooling fluid, such as water, directly into contact with this inductor surface 8. This cooling fluid is supplied in the illustrated arrangement through a suitable pipe connector 16 adapted to be secured to a source of cooling fluid supply through a flexible hose and is arranged to supply the cooling fluid into a header passage 17 in the stationary member core which communicates with a pair of inwardly extending cooling fluid passages 18 extending inwardly to cooling fluid distribution passages 19 which extend longitudinally through the two stationary core members 14 and 15. Cooling fluid is adapted to pass from the two distribution passages 19 into the coil recess 11 and to flow around the coil 9 to cool the same and remove the heat generated therein when energizing current flows therethrough, and cooling fluid also is adapted to pass from the distribution passages 19 through a plurality of inwardly extending supply openings 20 which are shown as extending into the uppermost slots 13 between the flux-concentrating teeth 12. This cooling fluid flows into the air gap between the faces of the teeth 12 and the inductor surface 8 into direct contact with the inductor surface 8 for removal of the heat generated therein by the flow of eddy current through this member of the machine. The cooling fluid is adapted to pass from the air gap outwardly from the center of the machine towards each end thereof and to be collected in the spaces in the end shields 5 from which it is drained from the lowermost part of the machine by suitable drain connections.

In order to minimize the passage of cooling fluid towards the bearings of the machine, suitable labyrinth seals 21 and 22 are arranged to cooperate with the rotatable member core 1 and the shaft 2 to prevent the entrance or passage of cooling fluid into the bearing housing around the bearing 3.

The flow of this cooling fluid, such as water, in contact with the inductor surface 8 of the rotatable member tends to deposit a scale on the surface 8 which forms an insulating coating and greatly impairs the effectiveness of the cooling liquid in removal of heat from the inductor 8 as the cooling liquid passes over this surface. It is desirable, therefore, to provide an arrangement in this apparatus for the removal of such scale formation. In the illustrated construction, I provide a scale remover support 23 secured to the relatively stationary member core adjacent the upper end thereof on each side of the field winding coil 9 and provide a bearing opening 24 therein which is adapted to support a bearing pin extension 25 formed on one end of a substantially cylindrical axially extending scraper member shaft 26 which is also rotatably supported in a suitable bearing arranged in a plug 27 mounted in the end shield 5 of the machine. This scraper member shaft 26 is formed with a plurality of scale-removing scraper blade elements 28 which are circumferentially and spirally spaced around the periphery of the shaft 26, as shown in Figs. 1 and 2, and the entire scraper mechanism is supported in a position such that the inner ends of the scraper blade elements 28 are adapted to extend to within a very small clearance of the outer inductor surface 8 of the rotatable member. The scraper blades 28 preferably are omitted in one axial position, and the shaft 26 should be turned for normal operation of the machine to a position such that the bladeless part of the shaft 26 is adjacent the inductor surface 8, as shown in Fig. 2, to minimize any possible interference between scale which might form on the surface 8 and the scraper structure under this condition. In order to prevent the accumulation of foreign material in the bearing openings 24 at the end of the machine in which the scraper structure is not mounted, I provide a plug member 29 mounted in a screw cap 30 which is adapted to replace the bearing plug 27 at the end of the machine. Scale which may have accumulated on the inductor surface 8 of the rotatable member may be removed by rotating the rotatable member by driving the shaft 2 thereof at any suitable speed and by rotating the scraper mechanism manually operating a suitable drive gearing therefor. In the illustrated arrangement, the scraper driving mechanism comprises a worm 31, or other suitable gear, mounted on a support 32 and is adapted to be rotated manually by a driving handle 33 and to transmit this rotative movement to the scraper shaft 26 by a spur gear wheel 34 mounted on the end of the shaft 26. This driving mechanism is mounted on the stationary member of the machine by securing a base plate 35 on which the scraper driving mechanism is supported directly to the stationary member by a bolt 36. After one side of the machine has had the scale removed from the rotatable member inductor surface 8, the scraper mechanism may be removed from this end of the machine, and the screw cap 30 and plug 29 removed from the other end of the machine and scraper mechanism mounted in this other end of the machine, such that this other part of the inductor surface 8 may similarly be cleaned of scale collected thereon. During normal operation of the machine, the scale cleaner mechanism may remain mounted in either end of the machine without in any way affecting its normal operation.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An inductor type dynamoelectric machine including internal and external relatively rotatable members with an air gap therebetween, an inductor eddy current air gap surface on said internal relatively rotatable member, flux-concentrating means with longitudinally extending slots therebetween in said external relatively rotatable member, means for supplying cooling fluid into said air gap for contact with a substantial part of said inductor surface, and means for removing scale from the outer inductor surface of said internal member including a rotatable axially extending scraper member mounted on said external member and arranged in one of said longitudinally extending slots between said flux-concentrating means.

2. An inductor type dynamoelectric machine including internal and external relatively rotatable members with an air gap therebetween, an inductor eddy current air gap surface on said internal relatively rotatable member, flux-concentrating means with longitudinally extending slots therebetween in said external relatively rotatable member, means for supplying cooling fluid into said air gap for contact with a substantial part of said inductor surface, means for removing scale from the outer inductor surface of said internal member including an axially extending scraper member rotatably mounted on said external member and arranged in one of said longitudinally extending slots between said flux-concentrating means, and means for rotating said scale remover shaft.

3. An inductor type dynamoelectric machine including internal and external relatively rotatable members with an air gap therebetween, an inductor eddy current air gap surface on said internal relatively rotatable member, flux-concentrating tooth means with longitudinally extending slots therebetween in said external relatively rotatable member, means for supplying cooling fluid into said air gap for contact with a substantial part of said inductor surface, means for removing scale from the outer inductor surface of said internal member including an axially extending shaft rotatably mounted on said external member and arranged in one of said longitudinally extending slots between said flux-concentrating tooth means, scraper blade elements spaced axially and spirally on said scale remover shaft, and means for rotating said scale remover shaft.

4. An inductor type dynamoelectric machine including internal and external relatively rotatable members with an air gap therebetween, a relatively smooth inductor eddy current air gap surface on said internal relatively rotatable member, flux-concentrating means with longitudinally extending slots therebetween in said external relatively rotatable member, means for supplying cooling liquid into said air gap for contact with a substantial part of said inductor surface, means including a field exciting winding for exciting said machine, means for removing scale from the outer inductor surface of said internal member including an axially extending scraper member rotatably mounted on said external member and arranged in one of said longitudinally extending slots between said flux-concentrating means, said scraper member being adapted to be rendered ineffective in one axial position whereby said scraper member does not interfere with said cooling fluid during normal operation of said machine, and means for rotating said scraper member.

5. An inductor type dynamoelectric machine including internal and external relatively rotatable members with an air gap therebetween, a relatively smooth inductor eddy current air gap surface on said internal relatively rotatable member, flux-concentrating tooth means with longitudinally extending slots therebetween in said external relatively rotatable member, means for supplying cooling liquid into said air gap for contact with a substantial part of said inductor surface, means including a field exciting winding for exciting said machine, means for removing scale from the outer inductor surface of said internal member including an axially extending shaft rotatably mounted on said external member and arranged in one of said longitudinally extending slots between said flux-concentrating means, scraper blade elements spaced axially and spirally on said scale remover shaft, said scraper blade elements being omitted in one axial position of said shaft whereby the flow of said cooling liquid is not interferred with during normal operation of said machine, and means for rotating said scale remover shaft.

6. An inductor type dynamoelectric machine including internal and external relatively rotatable members with an air gap therebetween, a relatively smooth inductor eddy current air gap surface on said internal relatively rotatable member, flux-concentrating means with longitudinally extending slots therebetween in said external relatively rotatable member, means including an axially extending fluid header passage in said external relatively rotatable member with inwardly extending supply passages communicating with said air gap at axially spaced points for supplying cooling fluid thereinto for contact with a substantial part of said inductor surface, means including a field exciting winding for exciting said machine, means for removing scale from the outer inductor surface of said internal member including an axially extending shaft rotatably mounted at one end adjacent said field exciting winding and at the other end on said external member and arranged in one of said longitudinally extending slots between said flux-concentrating means, scraper blade elements spaced axially and spirally on said scale remover shaft, said scraper blade elements being omitted in one axial position of said shaft whereby the flow of said cooling liquid is not interferred with during normal operation of said machine, and means for rotating said scale remover shaft.

7. An inductor type dynamoelectric machine including internal and external relatively rotatable members with an air gap therebetween, a relatively smooth inductor eddy current air gap surface on said internal relatively rotatable member, an end shield at each end of said external relatively rotatable member, flux-concentrating means with longitudinally extending slots therebetween in said external relatively rotatable member, means including an axially extending fluid header passage in said external relatively rotatable member with inwardly extending supply passages communicating with said air gap at axially spaced points for supplying cooling fluid thereinto for contact with a substantial part of said inductor surface, an annular field winding recess in said external relatively rotatable member intermediate the ends thereof, a field exciting winding in said recess, means for removing scale from the outer inductor surface of said internal member including an axially extending shaft rotatably mounted at one end adjacent said field exciting winding recess and at the other end on one of said external member end shields and arranged in one of said longitudinally extending slots between said flux-concentrating means, scraper blade elements spaced axially and spirally on said scale remover shaft, said scraper blade elements being omitted in one axial position of said shaft whereby the flow of said cooling liquid is not interferred with during normal operation of said machine, and means for rotating said scale remover shaft.

8. An inductor type dynamoelectric machine including internal and external relatively rotatable members spaced radially providing a longitudinally extending air gap therebetween, a relatively smooth inductor eddy current air gap surface on said internal relatively rotatable member, an end shield at each end of said external relatively rotatable member, flux-concentrating means with longitudinally extending slots therebetween in said external relatively rotatable member, means including an axially extending fluid header passage in said external relatively rotatable member with inwardly extending supply passages communicating with said air gap at axially spaced points for supplying cooling fluid thereinto for contact with a substantial part of said inductor surface, an annular field winding recess in said external relatively rotatable member intermediate the ends thereof, a field exciting winding in said recess with the sides of said field exciting winding spaced from the sides of said recess forming a cooling fluid circulating space around said field exciting winding, means for removing scale from the outer inductor surface of said internal member including an axially extending shaft rotatably mounted at one end adjacent said field exciting winding recess and the other end on one of said external member end shields and arranged in one of said longitudinally extending slots between said flux-concentrating means, scraper blade elements spaced axially and spirally on said scale remover shaft, said scraper blade elements being omitted in one axial position of said shaft whereby the flow of said cooling liquid is not interferred with during normal operation of said machine, and means for rotating said scale remover shaft.

HAROLD M. MARTIN.

REFERENCES CITED

The following references are of record in the file of this patent:

UNITED STATES PATENTS

| Number | Name | Date |
|---|---|---|
| 1,072,244 | Lynch | Sept. 2, 1913 |
| 2,398,638 | Hertel | Apr. 6, 1946 |